D. GEISER.
GRAIN SEPARATOR.

No. 43,766.  Patented Aug. 9, 1864.

Witnesses:
J W Coombs
G W Reed

Inventor:
Daniel Geiser
per Munn & Co
attorneys

UNITED STATES PATENT OFFICE.

DANIEL GEISER, OF WAYNESBOROUGH, PENNSYLVANIA.

GRAIN-SEPARATOR.

Specification forming part of Letters Patent No. 43,766, dated August 9, 1864.

*To all whom it may concern:*

Be it known that I, DANIEL GEISER, of Waynesborough, in the county of Franklin and State of Pennsylvania, have invented a new and Improved Grain-Separating Device for Thrashing-Machines; and I do hereby declare that the following is a full, clear, and exact description of the same, reference being had to the accompanying drawings, making a part of this specification, in which—

Figure 1:
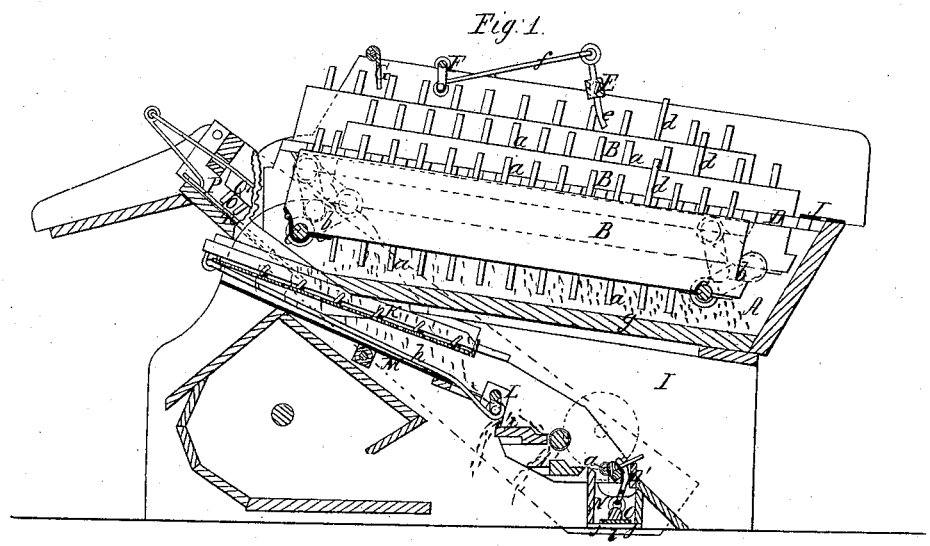
Figure 2:
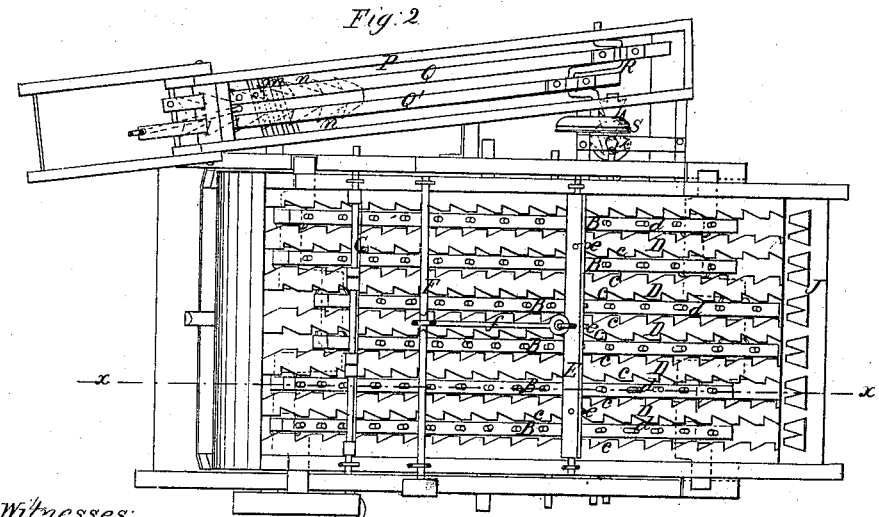

Figure 1 is a side sectional view of my invention, taken in the line $x\ x$, Fig. 2; Fig. 2, a plan or top view of the same.

Similar letters of reference indicate corresponding parts in the two figures.

This invention relates to a new and improved machine for separating grain from straw as the latter is delivered from a thrashing-machine.

The object of the invention is to obtain a device for the purpose specified which will effectually separate the loose grain from the straw while the latter is being conveyed away from the thrashing-machine, and also separate all dust and foreign substances from the grain.

To enable those skilled in the art to fully understand and construct my invention, I will proceed to describe it.

A represents a box or case in which the upper working parts of the device are placed, which parts consist of a series of parallel bars, B, arranged in pairs and provided with teeth $a$, both at their upper and lower edges, said teeth being slightly inclined. These bars B are connected at each end to cranks $b$ on shafts C, which pass through the front and back part of the box A, said cranks having a different position relatively with each other, and each pair of bars being attached to corresponding cranks on the shafts C. These cranks have a different position in order to enable the several pairs of bars B to rise and fall consecutively between bars D, which form a screen, the cranks, as one of the shafts C is turned, communicating a rising and falling, as well as a forward and backward movement to the bars B. The bars D of the screen have notched sides, as shown at $c$ in Fig. 2, to admit of the grain passing down between them, while the bars B, by the movement communicated to them, carry the straw to the outer end of the box or case A.

In each bar B, at its upper edge, there is placed one or more teeth, $d$, somewhat longer than the others, which serve to agitate and shake up the straw, so as to detach and loosen the grain in the same.

On the top of the box or case A there is placed transversely a rock-shaft, E, provided with pendant teeth $e$, which serve to scatter or spread the straw evenly on the bars B, preventing it from being carried by the same in bunches or in uneven layers. This rock-shaft E is operated by the pitman $f$ from a crank-shaft, F, which receives its motion by a belt or gearing from the shaft C, to which the driving-power is applied.

G is a swinging pendent plate provided with vertical notches and placed transversely on the top of the box or case A, directly in front of the crank-shaft E. This plate G serves to prevent loose straw from becoming detached from the main portion as it passes from the thrashing-machine on the bars B D, and said plate G may be composed of one or more parts. If more than one part is used, each part should swing freely or independently of the other. The grain that passes between the bars D falls upon the bottom $g$ of the box or case A, and is taken therefrom by the teeth $a$ at the under sides of the bars B, and is discharged upon a screen, H, in a box or case, I, on which the box or case A rests. At the outer ends of the bars D there is placed a narrow metal screen, J, which serves to admit of the free discharge of the straw, as well as the free passage of grain through it. The bars B D, it will be understood, are of wood, and the metal screen J is necessary or quite important at the ends of the bars D, as it will prevent grain from being carried over the outer ends of the bars D. The screen H is inclined, and has a reciprocating rake or agitator, K, working upon its upper surface and operated by a pitman, $h$, which is attached to a crank-shaft, L, and underneath the screen H there is placed an inclined plate or chute, M. Underneath the chute M the fan is placed, which expels from the grain all light foreign substances, the tailings being discharged into a box, N, and the first and second quality of grain being discharged at the points $i\ i'$, as shown in Fig. 1. The rake or agitator K effectually separates or loosens the grain from the heads, tailings, and other foreign substances, and the passage of the grain through the machine is indicated in red.

In the box N there is placed a bar, O, provided with a notched plate, j, at its sides, to serve as a means to convey the tailings into an inclined elevator-box, P, the elevators of which are composed of two reciprocating bars, Q Q', operated from a crank-shaft, R, and from which a receprocating motion is communicated to the bar O by means of friction or toothed gear S, a crank, k, a pitman, O', and a slide, $a^\times$. The box N has a perforated bottom, l, and a portion of the bottom of the elevator-box P is also perforated, as shown at m, and the bar Q is provided with teeth o, and has a notched plate, n, connected to it, precisely like the plate j of the bar O, while the bar Q' is also provided with teeth o. By this means the dust is taken from the tailings while the same is being conveyed back to the thrashing-machine.

Having thus described my invention, what I claim as new, and desire to secure by Letters Patent, is—

1. The combination of the stationary notched bars D D and reciprocating toothed bars B B, constructed and operating substantially as and for the purposes herein shown and described.

2. The combination of the reciprocating toothed bars B B and toothed rock-shaft E e, constructed and operating as and for the purposes specified.

3. The swinging plate G, composed of one or more parts and placed on the box or case A, when used in connection with the toothed bars B, for the purpose set forth.

4. The metal screen J, placed at the outer ends of the bars D, when used in connection with the toothed bars B, for the purpose set forth.

5. The reciprocating bar O, provided with notched plates j and fitted in a box, N, having a perforated bottom, l, for the purpose of conveying the tailings into the elevator-box P, as set forth.

DANIEL GEISER.

Witnesses:
JOHN M. BONEBRAKE,
MICHAEL M. STONER.